United States Patent
Saber et al.

(10) Patent No.: US 12,101,797 B2
(45) Date of Patent: Sep. 24, 2024

(54) METHODS AND SYSTEMS FOR USE OF CARRIER AGGREGATION CAPABILITY

(71) Applicant: Samsung Electronics Co., Ltd., Suwon-si (KR)

(72) Inventors: Hamid Saber, San Diego, CA (US); Jung Hyun Bae, San Diego, CA (US); Kee-Bong Song, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 930 days.

(21) Appl. No.: 16/905,673

(22) Filed: Jun. 18, 2020

(65) Prior Publication Data

US 2021/0022149 A1 Jan. 21, 2021

Related U.S. Application Data

(60) Provisional application No. 62/875,750, filed on Jul. 18, 2019, provisional application No. 62/970,636, filed on Feb. 5, 2020.

(51) Int. Cl.
| | |
|---|---|
| *H04W 72/54* | (2023.01) |
| *H04L 1/1812* | (2023.01) |
| *H04L 41/0803* | (2022.01) |
| *H04W 72/23* | (2023.01) |
| *H04W 72/542* | (2023.01) |
| *H04W 72/0453* | (2023.01) |

(52) U.S. Cl.
CPC ......... *H04W 72/542* (2023.01); *H04L 1/1812* (2013.01); *H04L 41/0803* (2013.01); *H04W 72/23* (2023.01); *H04W 72/0453* (2013.01)

(58) Field of Classification Search
CPC .. H04W 72/542; H04W 72/23; H04L 1/1812; H04L 41/0803
See application file for complete search history.

(56) References Cited

U.S. PATENT DOCUMENTS

| | | |
|---|---|---|
| 7,127,574 B2 | 10/2006 | Rotithor et al. |
| 8,989,004 B2 | 3/2015 | Zhang et al. |

(Continued)

FOREIGN PATENT DOCUMENTS

| | | |
|---|---|---|
| CN | 10907953 A | 12/2019 |
| WO | 2020/146848 A1 | 7/2020 |
| WO | 2021/022399 A1 | 2/2021 |

OTHER PUBLICATIONS

U.S. Final Office Action dated Sep. 28, 2021, issued in U.S. Appl. No. 16/990,907 (6 pages).

(Continued)

*Primary Examiner* — Curtis B Odom
(74) *Attorney, Agent, or Firm* — Lewis Roca Rothgerber Christie LLP (57) ABSTRACT

A method and system for use of carrier aggregation capability. In some embodiments, the method includes receiving, by a network, a declaration of capabilities, from a user equipment (UE), the declaration of capabilities including: a declaration of a first capability for a first component carrier (CC), and a declaration of a second capability for a second CC. The method may further include configuring, by the network, the UE with one or more CCs including the first CC and not including the second CC, the configuring including configuring the first CC with a configuration exceeding the first capability.

20 Claims, 3 Drawing Sheets

(56) References Cited

U.S. PATENT DOCUMENTS

| | | | |
|---|---|---|---|
| 9,584,407 | B2 | 2/2017 | Martin et al. |
| 10,470,191 | B2 | 11/2019 | Si et al. |
| 2016/0095104 | A1 | 3/2016 | Chen et al. |
| 2018/0019898 | A1 | 1/2018 | Takahashi et al. |
| 2018/0184415 | A1 | 6/2018 | Rong et al. |
| 2020/0052817 | A1 | 2/2020 | Kudekar et al. |
| 2020/0084754 | A1 | 3/2020 | Tsai et al. |
| 2020/0275308 | A1 | 8/2020 | Liu et al. |
| 2020/0322822 | A1 | 10/2020 | Tsai |
| 2020/0367241 | A1 | 11/2020 | Hosseini et al. |
| 2021/0144547 | A1* | 5/2021 | Feng ............... H04W 72/51 |

OTHER PUBLICATIONS

U.S. Office Action dated Jan. 21, 2022, issued in U.S. Appl. No. 16/990,907 (7 pages).

U.S. Final Office Action dated Jul. 13, 2022, issued in U.S. Appl. No. 16/990,907 (7 pages).

CATT: "Discussion on out-of-order scheduling/HARQ," R1-1906330, 3rd Generation Partnership Project (3GPP), May 2019, 9 pages, Retrieved from the Internet: URL:http://www.3gpp.org/ftp/Meetings%5F3GPP%5FSYNC/RAN1/Docs/R1%2D1906330%2Ezip [retrieved on May 13, 2019].

Huawei, et al., "Enhancements to scheduling/HARQ," RI-1906060, 3rd Generation Partnership Project (3GPP), May 2019, 9 pages, Retrieved from the Internet: URL:http://www.3gpp.org/ftp/Meetings%5F3GPP%5FSYNC/RAN1/Docs/R1%2D1906060%2Ezip [retrieved on May 13, 2019].

Qualcomm Incorporated: "Summary of Enhancements to Scheduling/HARQ," RI-1905902, 3rd Generation Partnership Project (3GPP), Apr. 2019, 25 pages, Retrieved from the Internet: URL:http://www.3gpp.org/ftp/tsg%5Fran/WG1%5FRL1/TSGR1%5F96b/Docs/R1%2D1905902%2Ezip [retrieved on Apr. 15, 2019].

Qualcomm Incorporated: "Summary #3 of Email discussion regarding the out-of-order HARQ issue," RI-1907925, 3RD Generation Partnership Project (3GPP), Apr. 2019, 10 pages, Retrieved from the Internet: URL:http://www.3gpp.org/ftp/tsg%5Fran/WG1%5FRL1/TSGR1%5F97/Docs/R1%2D1907925%2Ezip [retrieved on May 20, 2019].

EPO Extended Search Report dated Mar. 23, 2021, issued in corresponding European Patent Application No. 20184240.8 (18 pages).

EPO Partial European search Report dated Nov. 20, 2020, issued in corresponding European Patent Application No. 20184240.8 (14 pages).

Qualcomm Incorporated: "Enhancements to Scheduling and HARQ for eURLLC," R1-1907284, 3rd Generation Partnership Project (3GPP), May 2019, 10 pages, Retrieved from the Internet: URL:http://www.3gpp.org/ftp/Meetings%5F3GPP%5FSYNC/RAN1/Docs/R1%2D1907284%2Ezip [retrieved on May 13, 2019].

Qualcomm Incorporated: "Multi-TRP Enhancements," R1-1907289, 3rd Generation Partnership Project (3GPP), May 2019, 25 pages, Retrieved from the Internet: URL:http://www.3gpp.org/ftp/Meetings%5F3GPP%5FSYNC/RAN1/Docs/ R1%2D1907289%2Ezip [retrieved on May 13, 2019].

Qualcomm Incorporated: "PDCCH Enhancements for eURLLC," R1-1907281, 3rd Generation Partnership Project (3GPP), May 2019, 11 pages, Retrieved from the Internet: URL:http://www.3gpp.org/ftp/Meetings%5F3GPP%5FSYNC/RAN1/Docs/ R1%2D1907281%2Ezip [retrieved on May 13, 2019].

U.S. Notice of Allowance dated Oct. 19, 2022, issued in U.S. Appl. No. 16/990,907 (11 pages).

U.S. Office Action dated May 7, 2021, issued in U.S. Appl. No. 16/990,907 (8 pages).

Mediatek Inc.: "PDCCH enhancements for eURLLC," R1-1912116, 3rd Generation Partnership Project (3GPP), Nov. 2019, 10 pages, Retrieved from the Internet: URL:http://ftp.3gpp.org/tsg_ran/WG1_RL1/TSGR1_99/Docs/R1-1912116.zip [retrieved on Nov. 9, 2019].

EPO Extended European Search Report dated May 3, 2021, issued in European Patent Application No. 20214188.3 (10 pages).

Taiwanese Office Action for TW Application No. 109123653 dated Dec. 28, 2023, 9 pages.

Chinese Office Action for CN Application No. 202010674003.9 dated Dec. 29, 2023, 11 pages.

Qualcomm Incorporated: "sTTI Configuration," R1-1712775, 3rd Generation Partnership Project (3GPP), Aug. 2017, 4 pages, Retrieved from the Internet: URL:http://www.3gpp.org/ftp/tsg_ran/WG1_RL1/TSGR1_90/Docs/R1-1712775.zip.

Japanese Office Action dated Apr. 16, 2024, issued in Japanese Patent Application No. 2020-119900 (7 pages).

* cited by examiner

METHODS AND SYSTEMS FOR USE OF CARRIER AGGREGATION CAPABILITY

CROSS-REFERENCE TO RELATED APPLICATION(S)

The present application claims priority to and the benefit of U.S. Provisional Application No. 62/875,750, filed Jul. 18, 2019, entitled "SYSTEM AND METHOD FOR HANDLING OF OUT-OF ORDER HYBRID AUTOMATIC REPEAT REQUEST (HARQ) WITH MIXED PROCESSING TIME", and of U.S. Provisional Application No. 62/970,636, filed Feb. 5, 2020, entitled "SYSTEM AND METHOD FOR PROVIDING USER EQUIPMENT (UE) CAPABILITY SIGNALING ON SUPPORTING MULTI-TRANSMISSION AND RECEPTION POINT (M-TRP)", the entire contents of both which are incorporated herein by reference.

FIELD

One or more aspects of embodiments according to the present disclosure relate to wireless communications, and more particularly to a system and method for using excess capability available in a UE when it is configured for fewer component carriers than it is capable of handling.

BACKGROUND

In a 5G network, a user equipment (UE) may declare to the network various capabilities, including, e.g., a capability to support carrier aggregation (CA) with two or more component carriers (CCs), and, for each component carrier, the capability to support various features (e.g., Capability 1 or Capability 2) on the CC. In some circumstances, the network may configure the UE with fewer CCs than the UE declared an ability to support, and it may be advantageous, in such a situation, for the network and the UE to take advantage of the surplus UE capability that may result.

Thus, there is a need for a system and method for using excess capability available in a UE.

SUMMARY

According to an embodiment of the present invention, there is provided a method, including: receiving, by a network, a declaration of capabilities, from a user equipment (UE), the declaration of capabilities including: a declaration of a first capability for a first component carrier (CC), and a declaration of a second capability for a second CC; and configuring, by the network, the UE with one or more CCs including the first CC and not including the second CC, the configuring including configuring the first CC with a configuration exceeding the first capability.

In some embodiments: the first capability is Capability 1, the second capability is Capability 2, and the configuring includes configuring the first CC to support both Capability 1 and Capability 2.

In some embodiments, the configuring further includes configuring the first CC to support a capability selected from the group consisting of overlapping physical downlink shared channels (PDSCHs), overlapping physical uplink shared channels (PUSCHs), out of order PDSCHs, out of order PUSCHs, and out of order hybrid automatic repeat requests (HARQs).

In some embodiments: the first capability is Capability 2, the second capability is Capability 2, and the configuring includes configuring the first CC to support out of order hybrid automatic repeat requests (HARQs) between overlapping Capability 2 physical downlink shared channels (PDSCHs).

In some embodiments: the first capability is single transmission and reception point (TRP) operation, the second capability is single transmission and reception point (TRP) operation, and the configuring includes configuring the first CC to support multiple transmission and reception point (M-TRP) operation.

In some embodiments: the first capability is slot-based physical downlink control channel (PDCCH) monitoring, the second capability is span-based PDCCH monitoring, and the configuring includes configuring the first CC to monitor a PDCCH candidate with both slot-based PDCCH monitoring and span-based PDCCH monitoring.

In some embodiments: the first capability includes a first rank and a first modulation order; the second capability includes a second rank and a second modulation order; and the configuring includes configuring the first CC with: the lower of the first rank and the second rank, and the lower of the first modulation order and the second modulation order.

In some embodiments: the first capability includes a first rank and a first modulation order; the second capability includes a second rank and a second modulation order; and the configuring includes configuring the first CC to receive a first physical downlink shared channel (PDSCH) employing the first capability and a second physical downlink shared channel (PDSCH) employing the second capability.

In some embodiments: the declaration of capabilities includes declaring one of two capabilities for each of N CCs including the first CC and the second CC, N being an integer greater than 2, the declaring of the capabilities for the N CCs including: the declaration of a first capability for a first subset of the N CCs, and the declaration of a second capability for a second subset of the N CCs; and the configuring includes: configuring, by the network, the UE with k CCs from among the N CCs, k being a positive integer, configuring, by the network, p CCs, from among the k CCs, with a configuration exceeding both first and second capability, p being equal to the smaller of k and N-k.

According to an embodiment of the present invention, there is provided a method, including: sending, by a user equipment (UE), to a network, a declaration of capabilities, the declaration of capabilities including: a declaration of a first capability for a first component carrier (CC), and a declaration of a second capability for a second CC; and configuring, by the UE, in response to a configuration command received from the network, one or more CCs including the first CC and not including the second CC, the configuring including configuring the first CC with a configuration exceeding the first capability.

In some embodiments: the first capability is Capability 1, the second capability is Capability 2, and the configuring includes configuring the first CC to support both Capability 1 and Capability 2.

In some embodiments, the configuring further includes configuring the first CC to support a capability selected from the group consisting of overlapping physical downlink shared channels (PDSCHs), overlapping physical uplink shared channels (PUSCHs), out of order PDSCHs, out of order PUSCHs, and out of order hybrid automatic repeat requests (HARQs).

In some embodiments: the first capability is Capability 2, the second capability is Capability 2, and the configuring includes configuring the first CC to support out of order hybrid automatic repeat requests (HARQs) between overlapping Capability 2 physical downlink shared channels (PDSCHs).

In some embodiments: the first capability is single transmission and reception point (TRP) operation, the second capability is single transmission and reception point (TRP) operation, and the configuring includes configuring the first CC to support multiple transmission and reception point (M-TRP) operation.

In some embodiments: the first capability is slot-based physical downlink control channel (PDCCH) monitoring, the second capability is span-based PDCCH monitoring, the configuring includes configuring the first CC to monitor a PDCCH candidate with both slot-based PDCCH monitoring and span-based PDCCH monitoring.

In some embodiments: the first capability includes a first rank and a first modulation order; the second capability includes a second rank and a second modulation order; and the configuring includes configuring the first CC with: the lower of the first rank and the second rank, and the lower of the first modulation order and the second modulation order.

In some embodiments: the first capability includes a first rank and a first modulation order; the second capability includes a second rank and a second modulation order; and the configuring includes configuring the first CC to receive a first physical downlink shared channel (PDSCH) employing the first capability and a second physical downlink shared channel (PDSCH) employing the second capability.

In some embodiments: the declaration of capabilities includes declaring one of two capabilities for each of N CCs including the first CC and the second CC, N being an integer greater than 2, the declaring of the capabilities for the N CCs including: the declaration of a first capability for a first subset of the NCCs, and the declaration of a second capability for a second subset of the N CCs; and the configuring includes: configuring, by the the UE k CCs from among the N CCs, k being a positive integer, configuring, by the UE, p CCs, from among the k CCs, with a configuration exceeding both first and second capability, p being equal to the smaller of k and N-k.

In some embodiments, k is less than one-half of N.

According to an embodiment of the present invention, there is provided a method, including: sending, at a first point in time, by a network, to a user equipment (UE), a first physical downlink shared channel (PDSCH), the first PDSCH being a Capacity 1 PDSCH; sending, by the network, to the user equipment (UE), a Capacity 2 physical downlink shared channel (PDSCH); receiving, at a second point in time, by the network, from the UE, a physical uplink control channel (PUCCH) corresponding to the first PDSCH, the second point in time being later than the first point in time by an amount exceeding a standard-mandated ordinary maximum response delay for a Capacity 1 PDSCH.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for using excess capability available in a UE when it is configured for fewer component carriers than it is capable of handling provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
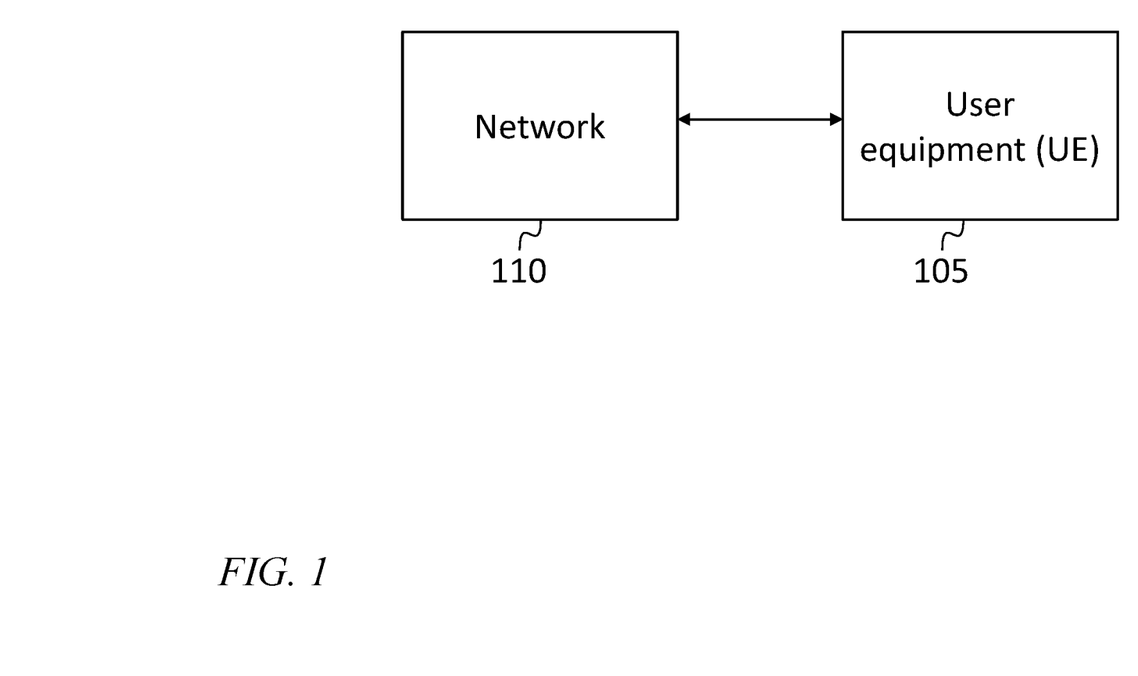
FIG. 1 is a block diagram, according to an embodiment of the present disclosure.

FIG. 1 is a simplified block diagram of two components of a 5G communication system, in some embodiments. A user equipment (UE) 105 forms a connection (e.g., a wireless connection) with a network 110 (e.g., with a base station of the network 110). In a 5G communication system, the user equipment (UE) 105 may be declare to the network 110 how many component carriers (CCs) it is capable of supporting, when carrier aggregation (CA) is employed, and it may further declare to the network 110 what capabilities it has on each of the CCs. In some embodiments, if the network 110 then configures the UE 105 with fewer CCs than the number declared by the UE, the UE may be capable of providing additional capabilities on the CCs for which it is configured. As used herein, certain phrases, such as "user equipment" and "downlink control information" (discussed in further detail below) are used as countable nouns even though the nouns they contain (e.g., "equipment" and "information") may not be countable in ordinary English.

As mentioned above, in one aspect of capability signaling by a UE to a network, the UE may declare its CA capability to indicate that it is capable of supporting of N CCs, or "cells". In some situations, the network may then, however, configure the UE with fewer CCs than the value N declared by the UE. In such a situation, which may be referred to as an "unused CA capability" case, the network may assume that some of the configured cells may be configured to support additional features (i.e., features in addition to those for which the UE declared a capability) via an implicit indication. The reason for the ability to support additional features may be that the UE's being relieved of the requirement to handle some of the CCs for which it declared a capability may free up resources in the UE (e.g., processing, memory, or power resources) which the UE may then instead employ to provide additional features on some or all of the CCs with which it is configured.

In some embodiments, this may mean that the UE may have the capacity for parallel (or extra) processing by utilizing unused CA (carrier aggregation) capability. In such a situation, for example, the UE may declare a set of capabilities (i.e., the UE may send a declaration of capabilities to the network, and the network may receive the declaration of capabilities from the UE), the declaration of capabilities including a declaration of a first capability (e.g., a capability referred to herein as "feature 1") for a first component carrier (CC), and a declaration of a second capability (e.g., a capability referred to herein as "feature 2") for a second CC. The UE may also be able to support both features, combined, i.e., feature 1 and feature 2, in one CC, if only one CC is configured to the UE. More generally, if the network configures the UE with one or more CCs including the first CC and not including the second CC (i.e., the network configures the UE with fewer CCs than the UE declared it could handle), then the network may configure the first CC with a configuration exceeding the first capability (e.g., configuring the first CC to support both feature 1 and feature 2).

Figure 2:
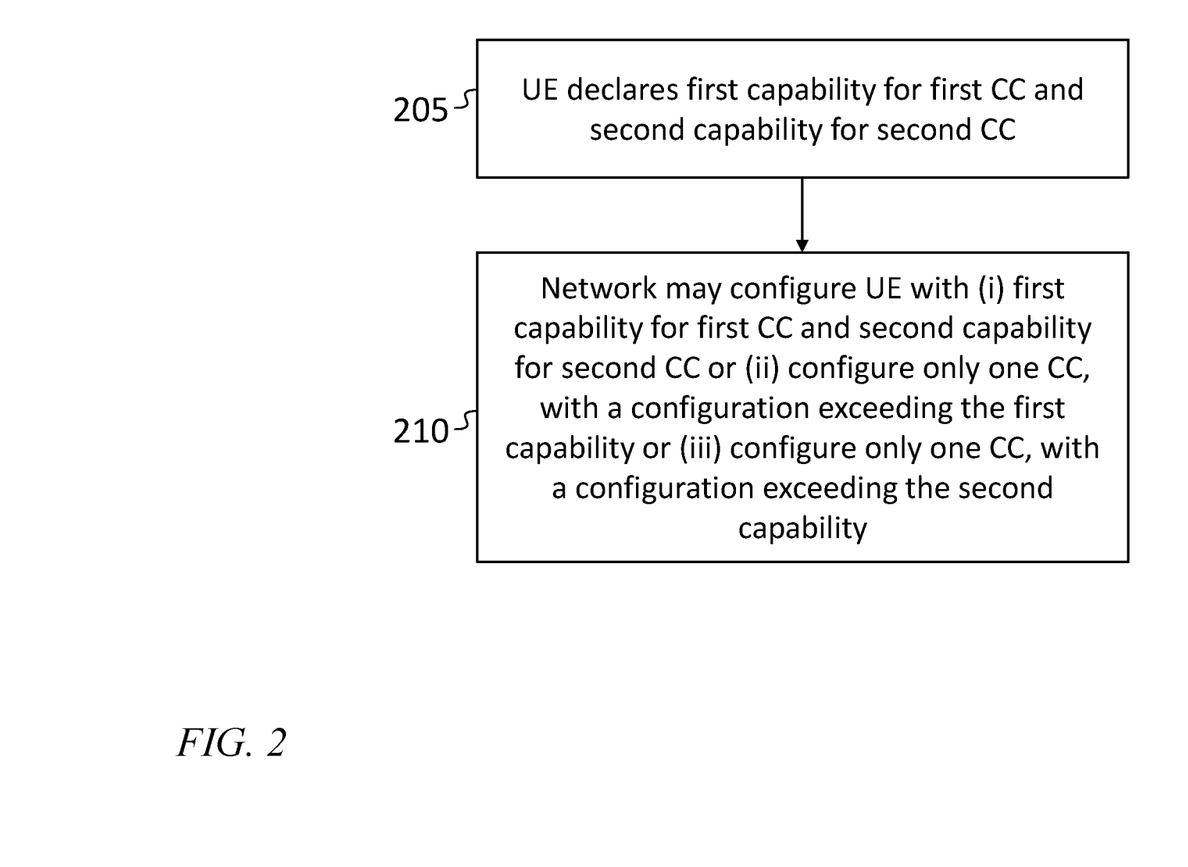
FIG. 2 is a flow chart, according to an embodiment of the present disclosure.

FIG. 2 shows a flow chart of this process, for the case in which two CCs are involved. In a given Band of Band Combination (Bo BC), the UE may declare, at 205, (i) the number of CCs it supports for low priority channels or operations only (e.g., Capability 1 channels), e.g., 2 CCs, and (ii) the number of CCs it supports if it is configured with both low and high priority channels or operations (e.g., one CC at low priority and one CC at high priority). The network may then, at 210, configure the UE with any of three possible configurations: (i) it may configure a first CC of the two CCs (e.g., CC0) for low priority operation and it may configure a second CC of the two CCs (e.g., CC1) for low priority operation (ii) it may configure the first CC (CC0) for low priority operation and it may configure the second CC (CC1) for high priority operation, or (iii) it may configure the first CC (CC0) for low priority operation and it may configure the first CC (CC0) for high priority operation (i.e., in option (iii) the network may configure only the first CC, with a configuration exceeding the first capability).

Feature 1 and feature 2 may include various capabilities that a UE may provide. As a first example, feature 1 may be supporting Capability 1 and feature 2 may be supporting Capability 2. In this example, the combined feature may be supporting mixed capabilities on a single cell (i.e., on a single CC) which includes out of order (OoO) handling of overlapping physical downlink shared channels (PDSCHs), and the sending of OoO PUSCHs or OoO hybrid automatic repeat request (HARQ). As used herein, the phrases "Capability 1" and "Capability 2" mean the terms with these names defined in the 5G standard (e.g., in Release 16), and refer to basic processing speed and to low-latency services respectively. The word "capability" as otherwise used herein has its ordinary English meaning, and refers to any capability (e.g., of a UE).

As a second example, feature 1 may be supporting single transmission and reception point (TRP) operation, e.g. single CORESETPoolIndex, and feature 2 may be the same as feature 1. As such, the UE, when configured with only the declared capability, may support single-TRP operation on each CC. When configured with fewer CCs than the number declared by the UE, the combined feature supported on one of the CCs may be supporting both TRPs on the same CC, i.e., supporting the M-TRP feature on that CC.

As a third example, feature 1 may be slot-based PDCCH monitoring (as in Release 15) and feature 2 may be span-based PDCCH monitoring (introduced in Release 16). The combined feature, in this example, may be mixed PDCCH monitoring. That is, the UE may monitor certain PDCCH candidates according to a slot-based limit and certain other candidates according to a span-based monitoring limit.

If feature 1 is Capability 1 and feature 2 is Capability 2, further restrictions may be implemented. Referring to the Capability 1 limit as $N_1$ and referring to the Capability 2 limit as $N_1'$, if two PDSCHs are sent to the UE such that an OoO situation is created, their Ack/Nack timings $T_1$ and (which may be configured by the network to the UE) may fall into one of the following 3 situations:

$$T_1 > N_1 > T_1' > N_1' \quad 1)$$

$$T_1 > T_1' > N_1 > N_1' \quad 2)$$

$$N_1 > T_1 > T_1' > N_1' \quad 3)$$

In situations 1) and 2) the UE may be expected to be capable of handling the combined feature in a CC configured to support the combination of feature 1 and feature 2, but in situation 3), the UE may not be capable of supporting the combination of feature 1 and feature 2, because doing so may require running two parallel Capability 2 processes. One candidate approach to this potential problem may be to configure the network so that it does not permit situation 3) to occur, but this approach may be disadvantageous if, in the future, the 5G standard evolves to cover situation 3). In this case, a restriction on the OoO combination may be used, depending on the declared UE capability and unused CA capability. For example the network may allow situation 3) to occur only if two CC's with Capability 2 declaration are available to use for the processing in one CC.

In a first example in which feature 1 is Capability 1 and feature 2 is Capability 2, the UE declares two-CC CA (i.e., support for CA with two CCs) with one CC capable of Capability 1 and one CC capable of Capability 2. In this case, the network may elect to configure only one CC, and may transmit both Capability 1 and Capability 2 PDSCHs to the UE involving OoO HARQ between Capability 1 and Capability 2 PDSCHs. In this example, the network may not configure the UE with one CC and transmit Capability 2 PDSCHs involving OoO HARQ.

In a second example in which feature 1 is Capability 1 and feature 2 is Capability 2, the UE declares two-CC CA with both CCs capable of Capability 2. The network may elect to configure only one CC and may transmit both Capability 1 and Capability 2 PDSCHs to the UE involving OoO HARQ between Capability 1 and Capability 2 PDSCHs. The network may also elect to configure only one CC and may transmit Capability 2 PDSCHs involving OoO HARQ.

In some circumstances, a UE's ability to support combinations of features (such as Capability 1 and Capability 2) may be affected by the PHY parameters used. For example, the UE may have declared support for feature 1, with a rank of 4, and a modulation order of 256 QAM in a first CC (CC0), and the UE may have declared support for feature 2, with a rank of 2, and a modulation order of 64 QAM in a second CC (CC1), in an inter-band CA BC (band combination). In this case, even if only CC0 is configured it may not be realistic for the UE to process combined feature 1 and feature 2 with a rank of 4 and with the maximum data rate corresponding to 256 QAM.

This potential difficulty may be addressed in several ways, of which two exemplary solutions are given below. In a first exemplary solution, the CC0 configuration is limited (i) for each PHY parameter, to the minimum PHY parameter value (i.e., the PHY parameter value that is least burdensome) of the values for CC0 and CC1, or (ii) to the combination of PHY parameters (of the combination of CC0 (e.g., rank 4, 256 QAM) and the combination of CC1 (e.g., rank 2, 64 QAM)). In some embodiments, for a subset, e.g., rank, modulation order, or the whole set of parameters a UE has declared, the minimum values, between the CC for which feature 1 was declared, and the CC for which feature 2 was declared, may be used as the limits for the corresponding PHY parameters of the CC supporting combined feature 1 and feature 2.

In a first example of the use of this first exemplary solution, the UE declares support for CA with two CCs, with one CC configured for Capability 1, rank 4, and 256 QAM, and the other CC configured for Capability 2, rank 2, and 64 QAM. In this case, the network may elect to configure only one CC and may transmit both Capability 1 and Capability 2 PDSCHs to the UE involving OoO HARQ between Capability 1 and Capability 2 PDSCHs. The PDSCHs may have up to rank 2 and up to the maximum data rate for 64 QAM.

In a second example of the use of the first exemplary solution, the UE declares support for CA with two CCs, with one CC configured for single-TRP, rank 4, and 256 QAM, and the other CC configured for single-TRP, rank 2, and 64 QAM. In this case, the network may elect to configure only one CC and may transmit PDSCHs from two TRPs to the UE. The PDSCHs may have up to rank 2 and up to the maximum data rate for 64 QAM.

In a third example of the use of the first exemplary solution, the UE declares support for CA with two CCs, with one CC configured for slot-based PDCCH monitoring, rank 4, and 256 QAM, and the other CC configured for span-based PDCCH monitoring, rank 2, and 64 QAM. In this case, the network may elect to configure only one CC with mixed slot-based and span-based PDCCH monitoring. The PDSCHs may have up to rank 2 and up to the maximum data rate for 64 QAM.

In a second exemplary solution, for a subset, e.g., rank, modulation order, or the whole set of parameters a UE has declared, the PHY parameter limits of the CC for which the UE declared feature 1 are applied to feature 1 PDSCHs, and the PHY parameter limits of the CC for which the UE declared feature 2 are applied to feature 2 PDSCHs, when combined feature 1 and feature 2 are supported in one CC. This exemplary solution may employ differentiation of PDSCHs according to the features, using a PDSCH-to-feature association.

In a first example of the use of this second exemplary solution, the UE declares support for CA with two CCs, with one CC configured for Capability 1, rank 4, and 256 QAM, and the other CC configured for Capability 2, rank 2, and 64 QAM. In this case, the network may elect to configure only one CC and may transmit both Capability 1 and Capability 2 PDSCHs to the UE involving OoO HARQ between Capability 1 and Capability 2 PDSCHs. The Capability 1 PDSCHs may have up to rank 4 and up to the maximum data rate for 256 QAM, and the Capability 2 PDSCHs may have up to rank 2 and up to the maximum data rate for 64 QAM.

In a second example of the use of the second exemplary solution, the UE declares support for CA with two CCs, with one CC configured for single-TRP, rank 4, and 256 QAM, and the other CC configured for single-TRP, rank 2, and 64 QAM. In this case, the network may elect to configure only one CC and may transmit PDSCHs from two TRPs to the UE. The PDSCHs associated with one of the TRPs may have up to rank 4 and up to the maximum data rate for 256 QAM. The PDSCHs associated with the other TRP may have up to rank 2 and up to the maximum data rate for 64 QAM.

In a third example of the use of the second exemplary solution, the UE declares support for CA with two CCs, with one CC configured for slot-based PDCCH monitoring, rank 4, and 256 QAM, and the other CC configured for span-based PDCCH monitoring, rank 2, and 64 QAM. In this case, the network may elect to configure only one CC with mixed slot-based and span-based PDCCH monitoring. The PDSCHs associated with slot-based PDCCH monitoring may have up to rank 4 and up to the maximum data rate for 256 QAM. The PDSCHs associated with span-based PDCCH monitoring may have up to rank 2 and up to the maximum data rate for 64 QAM.

The concept of reusing unused CA capability may be applied in the context of intra-band CA. The above methods and examples may be generalized to situations with CA including more than two CCs as follows: if a UE declares N respective capabilities for N CCs and the network elects to configure the UE with only k CCs, k being an integer less than N, then the UE may support the combined feature on p CCs, p being min(k, N-k), i.e., p being equal to the smaller of k and N-k. For example, if a UE declares a CA capability of N=8 and the network configures the UE with k=5 cells, then the UE and the network may assume that the UE supports the combined feature on min(8-5,5)=3 cells, e.g., on the 3 cells with the lowest or the highest indices. As another example, if a UE declares the CA capability of N=6 and the network configures the UE with k=3 cells, then the UE and the network may assume that the UE supports the combined feature on min(6-3, 3)=3 cells, e.g., on the 3 cells with the lowest or the highest indices, i.e. on all of the configured cells.

As used herein, "configuring" a UE means either (i) configuring itself, by the UE, in response to a configuration command received from the network, or (ii) sending, by the network, a configuration command to the UE. As such, a network may configure a UE with one or more CCs, each with a configuration (the configuration, ordinarily, being one for which the UE has a capability), or, equivalently, the UE may configure the one or more CCs in response to a command from the network.

Figure 3:
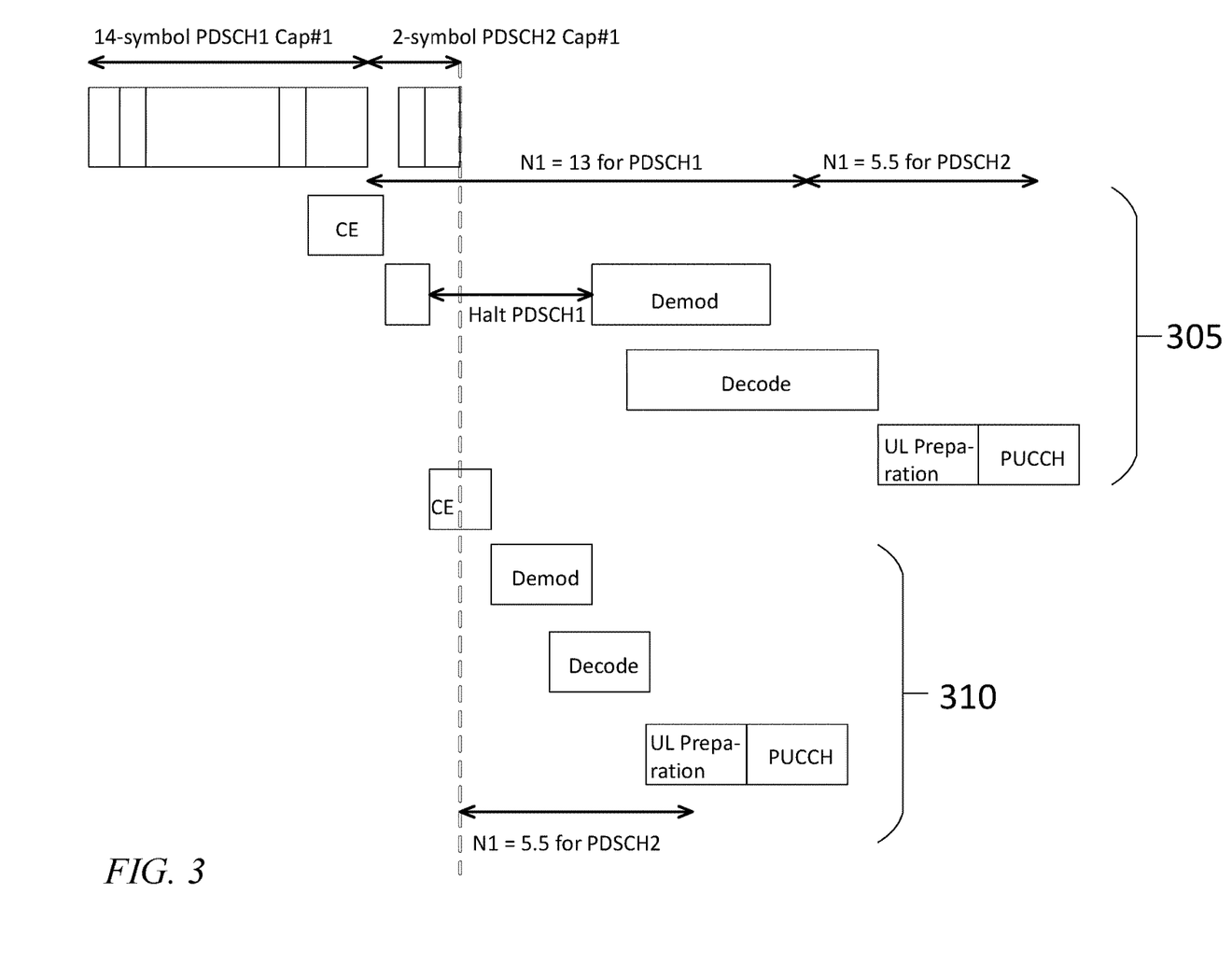
FIG. 3 is a schematic timing diagram, according to an embodiment of the present disclosure.

FIG. 3 illustrates a method for accommodating a UE with limited processing capability. In some of the examples discussed, above, a UE that is not CA-capable may not be able to support OoO HARQ. In some embodiments, this potential loss of capability for such UEs may be mitigated by appropriately increasing the Capability 1 PDSCH processing time. FIG. 3 shows a time sequence illustrating the operation of such a UE in an OoO HARQ situation.

As illustrated in FIG. 3, the UE may halt processing of PDSCH1 and process PDSCH2 before resuming processing of PDSCH1. When processing of PDSCH1 resumes, it may be that a UE with limited processing capability is not able to meet the original PDSCH1 processing time (or "standard-mandated ordinary maximum response delay for a Capacity 1 PDSCH") due to the delay incurred handling PDSCH2. To allow the processing of PDSCH1 to be completed in spite of this delay, the PDSCH1 processing time requirement is relaxed, in some embodiments, i.e., the allowable processing time is appropriately increased, and the network may receive the physical uplink control channel (PUCCH) corresponding to the PDSCH1 even though it is received by the network after a delay exceeding the standard-mandated ordinary maximum response delay for a Capacity 1 PDSCH. The amount of this increase may be implementation dependent; in some embodiments the increase is equal to the timing parameter $N_1$ for the processing of a Capability 2 PDSCH. In some embodiments, the increase in allowable processing time is augmented by an adjustment $\Delta >= 0$ to account for the UE burden.

For example, the network may configure combined Capability 1 and Capability 2 processing with OoO HARQ on a CC for which Capability 2 is enabled. When combined Capability 1 and Capability 2 processing with OoO HARQ is configured, the allowable processing time for a Capability 1 PDSCH followed by a Capability 2 PDSCH incurring OoO HARQ results in the network allowing a processing time, for the Capability 1 PDSCH, that is increased by the processing time of the Capability 2 PDSCH-FA.

In some embodiments, the network ensures the appropriate processing time in its ACK/NACK (A/N) PUCCH allocation. For example, the network may acknowledge such increased processing time when allocating A/N PUCCH for PDSCH1. However, the network may not be aware of the existence of PDSCH2 when it schedules PDSCH1 and its A/N resource. In such a case, the signaled A/N resource for PDSCH1 may be implicitly delayed by the increase in allowable processing time. When combined Capability 1 and Capability 2 processing with OoO HARQ is configured, the system may operate according to one of two methods.

In the first of these two methods, for a Capability 1 PDSCH followed by a Capability 2 PDSCH incurring OoO HARQ, the UE may be configured to provide a valid HARQ-ACK message. If the assigned A/N PUCCH resource satisfies Capability 1, the PDSCH processing time may be increased, by the network, by the processing time of the Capability 2 PDSCH+$\Delta$. In the second of these two methods, for a Capability 1 PDSCH followed by a Capability 2 PDSCH incurring OoO HARQ, a UE applies a delay amount of the processing time of the Capability 2 PDSCH+$\Delta$ for the assigned A/N PUCCH resource timing. In this second method, an appropriate quantization of delay amount to meet symbol boundary constraints, as well as a prioritization rule to handle a potential collision after applying delay, may be employed.

In some embodiments, the network includes a first processing circuit (e.g., one or more CPUs), and the UE contains a processing circuit. The processing circuits may perform the some or all of the methods described herein, e.g., sending and receiving (through suitable transmitting and receiving hardware, such as radio, microwave, or mm-wave transmitters and receivers) some of which may be external to the processing circuits, PDSCHs and PUCCHs. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, "a portion of" something means "at least some of" the thing, and as such may mean less than all of, or all of, the thing. As such, "a portion of" a thing includes the entire thing as a special case, i.e., the entire thing is an example of a portion of the thing.

As used herein, the term "or" should be interpreted as "and/or", such that, for example, "A or B" means any one of "A" or "B" or "A and B". As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for using excess capability available in a UE when it is configured for fewer component carriers than it is capable of handling have been specifically described and illustrated herein, many modifications and variations will be apparent to those skilled in the art. Accordingly, it is to be understood that a system and method for using excess capability available in a UE when it is configured for fewer component carriers than it is capable of handling constructed according to principles of this disclosure may be embodied other than as specifically described herein. The invention is also defined in the following claims, and equivalents thereof.

What is claimed is:

1. A method, comprising:
receiving, by a network, a declaration of capabilities, from a user equipment (UE),
the declaration of capabilities comprising:
a declaration of a first capability for a first component carrier (CC), and
a declaration of a second capability for a second CC; and
configuring, by the network, the UE with one or more CCs including the first CC and not including the second CC,
the configuring comprising configuring the first CC with a configuration exceeding the first capability.

2. The method of claim 1, wherein:
the first capability is Capability 1,
the second capability is Capability 2, and
the configuring comprises configuring the first CC to support both Capability 1 and Capability 2.

3. The method of claim 2, wherein the configuring further comprises configuring the first CC to support a capability selected from the group consisting of overlapping physical downlink shared channels (PDSCHs), overlapping physical uplink shared channels (PUSCHs), out of order PDSCHs, out of order PUSCHs, and out of order hybrid automatic repeat requests (HARQs).

4. The method of claim 1, wherein:
the first capability is Capability 2,
the second capability is Capability 2, and
the configuring comprises configuring the first CC to support out of order hybrid automatic repeat requests (HARQs) between overlapping Capability 2 physical downlink shared channels (PDSCHs).

5. The method of claim 1, wherein:
the first capability is single transmission and reception point (TRP) operation,
the second capability is single transmission and reception point (TRP) operation, and
the configuring comprises configuring the first CC to support multiple transmission and reception point (M-TRP) operation.

6. The method of claim 1, wherein:
the first capability is slot-based physical downlink control channel (PDCCH) monitoring,
the second capability is span-based PDCCH monitoring, and
the configuring comprises configuring the first CC to monitor a PDCCH candidate with both slot-based PDCCH monitoring and span-based PDCCH monitoring.

7. The method of claim 1, wherein:
the first capability includes a first rank and a first modulation order;
the second capability includes a second rank and a second modulation order; and
the configuring comprises configuring the first CC with:
the lower of the first rank and the second rank, and
the lower of the first modulation order and the second modulation order.

8. The method of claim 1, wherein:
the first capability includes a first rank and a first modulation order;
the second capability includes a second rank and a second modulation order; and
the configuring comprises configuring the first CC to receive
a first physical downlink shared channel (PDSCH) employing the first capability and
a second physical downlink shared channel (PDSCH) employing the second capability.

9. The method of claim 1, wherein:
the declaration of capabilities comprises declaring one of two capabilities for each of N CCs including the first CC and the second CC, N being an integer greater than 2, the declaring of the capabilities for the N CCs including:
the declaration of a first capability for a first subset of the N CCs, and
the declaration of a second capability for a second subset of the N CCs; and
the configuring comprises:
configuring, by the network, the UE with k CCs from among the N CCs, k being a positive integer,
configuring, by the network, p CCs, from among the k CCs, with a configuration exceeding both first and second capability, p being equal to the smaller of k and N-k.

10. A method, comprising:
sending, by a user equipment (UE), to a network, a declaration of capabilities,
the declaration of capabilities comprising:
a declaration of a first capability for a first component carrier (CC), and
a declaration of a second capability for a second CC; and
configuring, by the UE, in response to a configuration command received from the network, one or more CCs including the first CC and not including the second CC,
the configuring comprising configuring the first CC with a configuration exceeding the first capability.

11. The method of claim 10, wherein:
the first capability is Capability 1,
the second capability is Capability 2, and
the configuring comprises configuring the first CC to support both Capability 1 and Capability 2.

12. The method of claim 11, wherein the configuring further comprises configuring the first CC to support a capability selected from the group consisting of overlapping physical downlink shared channels (PDSCHs), overlapping physical uplink shared channels (PUSCHs), out of order PDSCHs, out of order PUSCHs, and out of order hybrid automatic repeat requests (HARQs).

13. The method of claim 10, wherein:
the first capability is Capability 2,
the second capability is Capability 2, and
the configuring comprises configuring the first CC to support out of order hybrid automatic repeat requests (HARQs) between overlapping Capability 2 physical downlink shared channels (PDSCHs).

14. The method of claim 10, wherein:
the first capability is single transmission and reception point (TRP) operation,
the second capability is single transmission and reception point (TRP) operation, and
the configuring comprises configuring the first CC to support multiple transmission and reception point (M-TRP) operation.

15. The method of claim 10, wherein:
the first capability is slot-based physical downlink control channel (PDCCH) monitoring,
the second capability is span-based PDCCH monitoring, the configuring comprises configuring the first CC to monitor a PDCCH candidate with both slot-based PDCCH monitoring and span-based PDCCH monitoring.

16. The method of claim 10, wherein:
the first capability includes a first rank and a first modulation order;
the second capability includes a second rank and a second modulation order; and
the configuring comprises configuring the first CC with:
the lower of the first rank and the second rank, and
the lower of the first modulation order and the second modulation order.

17. The method of claim 10, wherein:
the first capability includes a first rank and a first modulation order;
the second capability includes a second rank and a second modulation order; and
the configuring comprises configuring the first CC to receive
a first physical downlink shared channel (PDSCH) employing the first capability and
a second physical downlink shared channel (PDSCH) employing the second capability.

18. The method of claim 10, wherein:
the declaration of capabilities comprises declaring one of two capabilities for each of N CCs including the first CC and the second CC, N being an integer greater than 2, the declaring of the capabilities for the N CCs including:
the declaration of a first capability for a first subset of the N CCs, and
the declaration of a second capability for a second subset of the N CCs; and
the configuring comprises:
configuring, by the UE, k CCs, from among the N CCs, k being a positive integer,
configuring, by the UE, p CCs, from among the k CCs, with a configuration exceeding both first and second capability, p being equal to the smaller of k and N-k.

19. The method of claim 18, wherein k is less than one-half of N.

20. The method of claim 10, wherein the first capability is the entire capability declared by the UE for the first CC.

* * * * *